（12） United States Patent
Qi et al.

(10) Patent No.: US 10,176,214 B2
(45) Date of Patent: Jan. 8, 2019

(54) METHOD FOR APPLICATION MANAGEMENT, AS WELL AS SERVER AND TERMINAL DEVICE THEREOF

(71) Applicant: Xiaomi Inc., Beijing (CN)

(72) Inventors: Dongjie Qi, Beijing (CN); Mingxue Kangshang, Beijing (CN); Xinyu Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 405 days.

(21) Appl. No.: 14/878,158

(22) Filed: Oct. 8, 2015

(65) Prior Publication Data

US 2016/0026676 A1 Jan. 28, 2016

Related U.S. Application Data

(63) Continuation-in-part of application No. PCT/CN2013/091019, filed on Dec. 31, 2013.

(30) Foreign Application Priority Data

Apr. 8, 2013 (CN) .......................... 2013 1 0119920

(51) Int. Cl.
G06F 17/30 (2006.01)
G06F 9/445 (2018.01)
G06F 8/61 (2018.01)

(52) U.S. Cl.
CPC .......... *G06F 17/30371* (2013.01); *G06F 8/62* (2013.01); *G06F 9/445* (2013.01); *G06F 17/30348* (2013.01)

(58) Field of Classification Search
CPC ...... G06F 17/30371; G06F 8/62; G06F 9/445; G06F 17/30348

USPC ........................................................ 707/694
See application file for complete search history.

(56) References Cited

U.S. PATENT DOCUMENTS

| 5,930,514 A | 7/1999 | Thompson et al. |
| 2007/0208843 A1 | 9/2007 | Wexler et al. |
| 2007/0294687 A1 | 12/2007 | Masselle et al. |

(Continued)

FOREIGN PATENT DOCUMENTS

| CN | 1617101 A | 5/2005 |
| CN | 1874563 A | 12/2006 |

(Continued)

OTHER PUBLICATIONS

Extended European Search Report dated Oct. 31, 2016 for European Application No. 138817960.0, 13 pages.

(Continued)

*Primary Examiner* — Evan Aspinwall
(74) *Attorney, Agent, or Firm* — Brinks, Gilson & Lione (57) ABSTRACT

The present disclosure relates to methods for application program management as well as servers and terminal devices implementing the same. The method may include obtaining an application-file association list and managing applications installed therein according to the application-file association list. The application and file association list is obtained through statistics analysis of a server according to application program information of an application reported by the terminal device and file operation behaviors that the applications invoke a system read and write interface.

11 Claims, 6 Drawing Sheets

(56) References Cited

U.S. PATENT DOCUMENTS

| | | | | |
|---|---|---|---|---|
| 2010/0262959 A1* | 10/2010 | Bruno | ............... | G06F 21/6209 |
| | | | | 717/171 |
| 2012/0129503 A1* | 5/2012 | Lindeman | ............. | H04W 4/001 |
| | | | | 455/414.1 |
| 2014/0006616 A1* | 1/2014 | Aad | ................... | G06F 21/552 |
| | | | | 709/225 |
| 2014/0304313 A1* | 10/2014 | Choi | ................ | G06F 17/30194 |
| | | | | 707/827 |

FOREIGN PATENT DOCUMENTS

| | | | |
|---|---|---|---|
| CN | 101751535 A | 6/2010 |
| CN | 103246595 A | 8/2013 |
| JP | 2000-112717 A | 4/2000 |
| JP | 2004-265141 A | 9/2004 |
| JP | 2005-129063 A | 5/2005 |
| JP | 2007-257319 A | 10/2007 |
| JP | 2011-203917 A | 10/2011 |
| JP | 2012-008688 A | 1/2012 |
| KR | 10-2005-0017674 A | 2/2005 |
| KR | 10-2009-0002122 A | 1/2009 |
| KR | 10-0918626 B1 | 9/2009 |
| KR | 10-2011-0023480 A | 3/2011 |
| KR | 10-2013-0006304 A | 1/2013 |
| RU | 2 477 879 C2 | 3/2013 |

OTHER PUBLICATIONS

International Search Report dated Apr. 3, 2014 for International Application No. PCT/CN2013/091019, 5 pages.

Office Action dated Apr. 3, 2015 for Chinese Application No. 201310119920.0, 7 pages.

Office Action dated May 19, 2016 for Japanese Application No. 2015-543290, 3 pages.

Office Action dated Mar. 10, 2016 for Korean Application No. 10-2015-7013583, 8 pages.

Office Action dated Oct. 14, 2016 for Russian Application No. 2015121497/08, 13 pages.

Notice of Allowance dated Apr. 28, 2017 for Korean Application No. 10-2015-7013583, 7 pages.

* cited by examiner

METHOD FOR APPLICATION MANAGEMENT, AS WELL AS SERVER AND TERMINAL DEVICE THEREOF

PRIORITY STATEMENT

This application is a Continuation-In-Part Application of International Application PCT/CN2013/091019, with an international filing date of Dec. 31, 2013, which is based on and claims priority to Chinese Patent Application No. 201310119920.0, filed on Apr. 8, 2013, the entire contents of which are incorporated herein by reference.

TECHNICAL FIELD

The present disclosure generally relates to the field of terminal device, and more particularly, to a method for application management, as well as a server and a terminal device thereof.

BACKGROUND

The popularization of terminal devices, such as a smart mobile phone and a tablet computer, and the upsurge of application stores overturns many concepts of in the field of terminal devices. For example, functions of a terminal device are greatly expanded and enriched by installation of applications compatible with operating systems. The installation of applications is to install application files into file systems of a terminal device for execution. In the process of using applications, a purpose of storing data is achieved by creating and altering files in file systems according to requirements for applications. As time goes by, running of these applications may produce many junk files. Sometimes, even though a user uninstalls a certain application, files produced by the application are not deleted but still retained in the user's file system. While browsing the file system, the user would not know which applications create these files, thus the user are unable to sort his/her documents and data. Accumulation of junk files will undoubtedly impact the normal operating speed and processing capacity of the terminal device. However, when the user deletes documents and data by him/herself, irreparable consequences may be caused to startup and normal operations of the terminal device once some critical files are deleted.

SUMMARY

Embodiments of the present disclosure provide a method for application management, as well as a server and a terminal device thereof. The technical solution is as below.

On the one hand, a method application management is provided, comprising:

acquiring an application-file association list, the application-file association list being obtained from a server by making a statistics according to application information of an application and file operation behavior of the application executed by invoking a system read-write interface reported from a terminal device; and performing management on the application according to the application-file association list.

On the other hand, a method for application management is further provided, comprising:

receiving application information of an application and file operation behavior of the application executed by invoking a system read-write interface sent from a terminal device; and collecting the application information and the file operation behavior received to generate an application-file association list.

On the other hand, a device for application management is provided, comprising:

an association list acquisition module, configured to acquire an application-file association list, the application-file association list being obtained from a server by making a statistics according to application information of an application and file operation behavior of the application executed by invoking a system read-write interface reported from a terminal device; and an application management module, configured to perform management on the application according to the application-file association list.

On the other hand, a device application management is further provided, comprising:

an information receiving module, configured to receive application information of an application and file operation behavior of the application executed by invoking a system read-write interface sent from a terminal device; and a list generating module, configured to collect and conduct a statistic analysis of the application information and the file operation behavior received to generate an application-file association list.

On the other hand, a terminal device is provided, comprising:

a processor; and a memory for storing instructions executable by the processor;

wherein the processor is configured to perform:

acquiring an application-file association list, the application-file association list being obtained from a server by making a statistics according to application information of an application and file operation behavior of the application executed by invoking a system read-write interface reported from a terminal device; and performing management on the application according to the application-file association list.

On the other hand, a server is provided, comprising: a receiver, a processor and a transmitter, wherein the receiver, the processor and the transmitter are coupled with each other;

the receiver is configured to receive application information of an application and file operation behavior of the application executed by invoking a system read-write interface sent from a terminal device; and the processor is configured to collect and conduct a statistic analysis of the application information and the file operation behavior received to generate an application-file association list.

In a method for application management, as well as a device, a server and a terminal device according to the exemplary embodiments of the present disclosure, an application-file association list is acquired, which is obtained from a server by making a statistics according to application information of an application and file operation behavior of the application executed by invoking a system read-write interface reported from a terminal device, and the application is managed according to the application-file association list. In the present disclosure, an application-file association list is acquired from a server, thus files associated with an application may be managed during management on the application, by the application and a file record associated with the application as indicated in the list, thereby reducing requirements of technical cost for users of terminal device, and preventing from impacting normal operating speed and processing capacity of the terminal device due to accumulation of junk files, and guaranteeing start-up and normal operation of the terminal device.

It will be appreciated that both the foregoing general description and the following detailed description are exemplary and explanatory only and are not restrictive of the disclosure.

BRIEF DESCRIPTION OF THE DRAWINGS

Simple description of the present disclosure will be made with reference to drawings in order to make technical solutions in the embodiments of the present disclosure more clearly. Obviously, drawings to be described hereinafter are merely some embodiments of the present disclosure, and those of ordinary skill in the art may acquire, under the premise of not contributing creative effort, other drawings according to these drawings.

Specific embodiments of the present disclosure are shown by the above drawings, and more detailed description will be made hereinafter. These drawings and text description are not for limiting the scope of conceiving the present disclosure in any way, but for illustrating the concept of the present disclosure for those skilled in the art by referring to specific embodiments.

DETAILED DESCRIPTION

Detailed description of the present disclosure will further be made with reference to drawings in order to make the above objects, technical solutions and advantages of the present disclosure more apparent.

Figure 8:
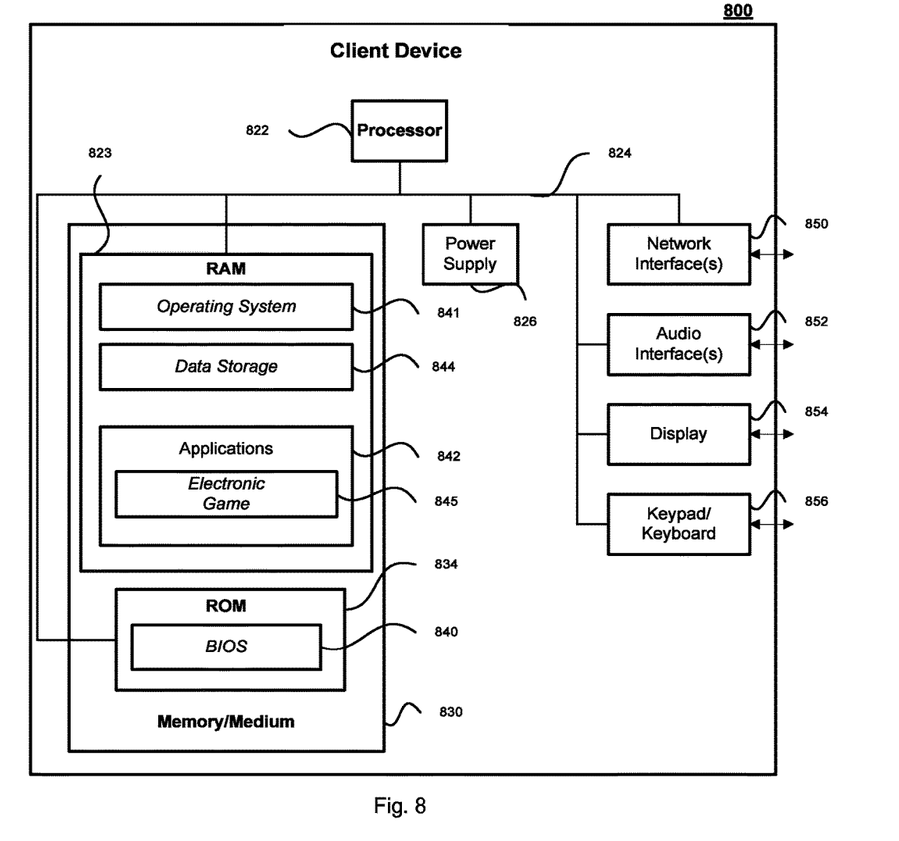
FIG. 8 is a schematic diagram illustrating an exemplary embodiment of a client device.

FIG. 8 is a schematic diagram illustrating an exemplary embodiment of a client device that may be a terminal device as introduced in the present disclosure. The client device may include apparatuses to execute methods and software systems introduced in the present disclosure. A client device 800 may be a computing device capable of executing a software system. The client device 800 may, for example, be a device such as a personal desktop computer or a portable device, such as a laptop computer, a tablet computer, a cellular telephone, or a smart phone.

The client device 800 may vary in terms of capabilities or features. Claimed subject matter is intended to cover a wide range of potential variations. For example, the client device 800 may include a keypad/keyboard 856. It may also include a display 854, such as a liquid crystal display (LCD), or a display with a high degree of functionality, such as a touch-sensitive color 2D or 3D display. In contrast, however, as another example, a web-enabled client device 800 may include one or more physical or virtual keyboards, and mass storage medium 830.

The client device 800 may also include or may execute a variety of operating systems 841, including an operating system, such as a Windows™ or Linux™, or a mobile operating system, such as iOS™, Android™, or Windows Mobile™. The client device 800 may include or may execute a variety of possible applications 842, such as an electronic game 845. An application 842 may enable communication with other devices via a network, such as communicating with another computer or server via a network for online browsing.

Further, the client device 800 may include one or more non-transitory processor-readable storage media 830 and one or more processors 822 in communication with the non-transitory processor-readable storage media 830. For example, the non-transitory processor-readable storage media 830 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 830 may store sets of instructions, or units and/or modules that include the sets of instructions, for conducting operations and/or method steps described in the present disclosure. Alternatively, the units and/or modules may be hardware disposed in the client device 800 configured to conduct operations and/or method steps described in the present disclosure. The one or more processors may be configured to execute the sets of instructions and perform the methods and/or operations in example embodiments of the present disclosure.

Figure 9:
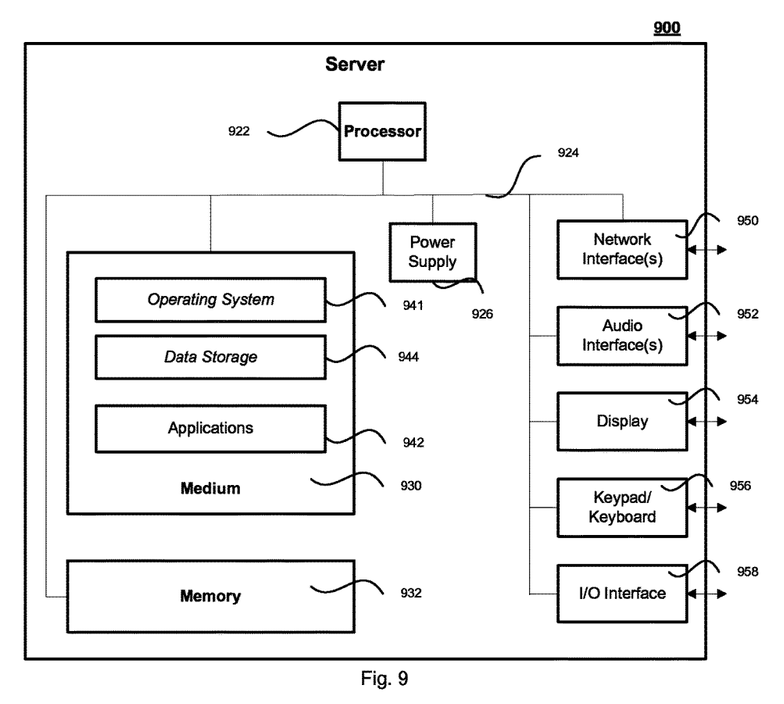
FIG. 9 is a schematic diagram illustrating an exemplary embodiment of a server.

FIG. 9 is a schematic diagram illustrating an example embodiment of a server. The server 900 may be a server as described in the present disclosure and may connect to the client device 800 locally or via a network. A Server 900 may vary widely in configuration or capabilities, but it may include one or more central processing units 922 and memory 932, one or more medium 930 (such as one or more transitory and/or non-transitory mass storage devices) storing application programs 942 or data 944. The processing units 922 may execute the application programs 942 or data 944 to perform methods disclosed in the present disclosure.

The server 900 may further include, one or more power supplies 926, one or more wired or wireless network interfaces 950, one or more input/output interfaces 958, and/or one or more operating systems 941, such as Windows Server™, Mac OS X™, Unix™, Linux™, FreeBSD™, or the like. Thus a server 900 may include, as examples, dedicated rack-mounted servers, desktop computers, laptop computers, set top boxes, mobile computational devices such as smart phones, integrated devices combining various features, such as two or more features of the foregoing devices, or the like.

Merely for illustration, only one processor will be described in client devices and server that execute operations and/or method steps in the following example embodiments. However, it should be note that the client devices and server in the present disclosure may also include multiple processors, thus operations and/or method steps that are performed by one processor as described in the present disclosure may also be jointly or separately performed by the multiple processors. For example, if in the present disclosure a processor of a client device executes both step A and step B, it should be understood that step A and step B may also be performed by two different processors jointly or separately in the client device (e.g., the first processor executes step A and the second processor executes step B, or the first and second processors jointly execute steps A and B).

Figure 1:
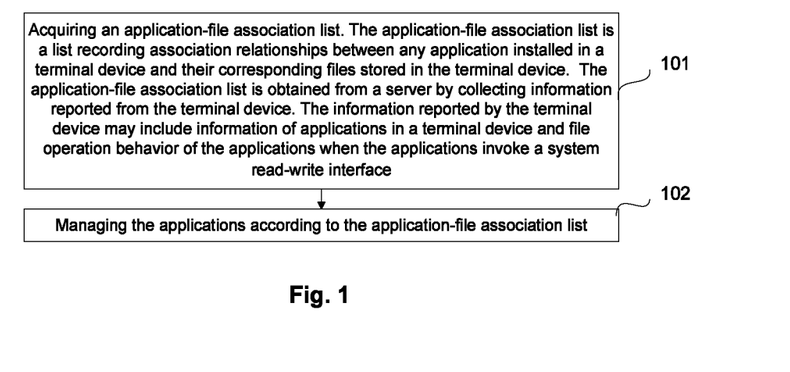
FIG. 1 is a flowchart of a method for application management according to exemplary embodiments of the present disclosure.

FIG. 1 is a flowchart of a method for application management according to the exemplary embodiments of the present disclosure. The method may be implemented in a terminal device, such as the client device 800 in FIG. 8. For example, the method may be stored in a storage medium of the client device 800 as a set of instructions and may be executed by the processor of the client device 800. The method may include the following operations:

101. Acquiring an application-file association list.

The application-file association list is a list recording identifications of one or more applications installed in the terminal device and their corresponding files of the one or more applications stored in the terminal device. For example, the application-file association list may include the identification of a particular application installed in the terminal device. It also includes a file recording a system read-write interface invocation history of the application. As a result, the application-file association list may record what files an application reads when a user runs the application, as well as what files the application writes during the application is in operation. The application-file association list may record the application reads and writes history by recording paths of each file and time that the files were read and/or write. Through the application-file association list, one may be able to track down all the files saved in the terminal device that are associated with the application. For example, a user may install an application of a Xiaomi™ smart home system in his mobile device. When the smart home system application is in operation, the application-file association list may record a complete history of the files that the smart home system application reads and writes. When the user wishes to uninstall the smart home system application, the mobile device may obtain the smart home system application and delete every file in the application-file association list. Because the list record the complete read and write history of the application, the mobile device may be able to conduct a complete uninstallation.

The file may record the system read-write interface invocation history of the application in the terminal device alone. Alternatively, the file may also record a cumulative system read-write interface invocation history of the application in a plurality of other terminal devices. For example, a server, such as a cloud server, may collect the system read-write interface invocation history of a plurality of terminal devices that install the application to generate a comprehensive and accumulative result as the accumulative system read-write interface invocation history of the application. Thus the accumulative system read-write interface invocation history may include information not merely limited to a single terminal device, but statistical information of the application.

It should be note that only common and/or ordinary read-write interface invocation information is useful. Read-write interface invocation activities that are uncommon to the plurality of mobile devices (or general use of the mobile devices) may indicate intentional save by the user. For example, a user may call an application to generate certain MSWORD™ documents and save the MSWORD™ documents in a particular folder. The MSWORD™ documents may not be a document that the application daily read-write, and the content included in the MSWORD™ documents ma be something that the user wishes to keep in the mobile device. Accordingly, the mobile device and/or the cloud server may not listed the MSWORD™ documents in the list, or may leave identifications of the MSWORD™ documents in the list, so that when the mobile device uninstall the application, it may keep the corresponding MSWORD™ documents.

To this end, the mobile device and/or the server may place in the list only read-write interface invocation accumulative information that is common among the plurality of terminal devices. Read-write interface invocation indicating a user's intentional behavior may be filtered out from the list. For example, compared to ordinary read-write interface invocation activities of the application, the read-write interface invocation activities related to the MSWORD™ documents are infrequent. When the read-write interface invocation information of the plurality of mobile devices (e.g., a representation of mobile devices with certain application in general) are accumulated, the percentage of the MSWORD™ documents read-write interface invocation activities are even lesser. Accordingly, when the frequency of read-write interface invocation activity associated with a document is lower than a predetermined frequency, or when the number of or percentage of read-write interface invocations for a document is lower than a predetermined number, the mobile device and/or cloud server may determine that the corresponding document is a "personal document" of the user and may not list the document in the list or may leave identification information to prevent the document from being deleted during uninstall procedure of the application.

The application-file association list is obtained from a server that collects information reported from the terminal device and/or a plurality of other terminal devices. The information reported by the terminal device may include information of the identifications of the one or more applications in a terminal device and file operation behavior of the applications when the applications invoke the system read-write interface.

102. Managing the applications according to the application-file association list. The managing of an application may include, but not limited to, deleting the application, updating the application into a different version, saving operation data of the application, deactivating the application when the application idles longer than a predetermined time etc.

In the technical solution according to the exemplary embodiments of the present disclosure, an application-file association list is acquired from a server, thus files associated with an application may be managed during management on the application, by the application and a file record associated with the application as indicated in the list, thereby reducing requirements of technical cost for users of terminal device, and preventing from impacting normal operating speed and processing capacity of the terminal device due to accumulation of junk files, and guaranteeing start-up and normal operation of the terminal device.

Before the acquiring of the application-file association list, the method may further comprise: monitoring invocations of the system read-write interface; recording the application information of the application and the file operation behavior of the application executed by invoking the system read-write interface if an invocation of the system read-write interface from the application is acquired; and sending data recorded at the terminal device to the server.

The sending of the data recorded at the terminal device to the server may further comprise: sending periodically the data recorded at the terminal device to the server.

The performing of the management on the application according to the application-file association list may comprise: if a first application is to be uninstalled, querying the application-file association list according to application information of the first application, and deleting files, corresponding to a file record obtained by the querying, from the terminal device.

The performing of the management on the application according to the application-file association list may further comprise: displaying correspondingly an application name and a file record associated with the application if the application-file association list is checked.

Figure 2:
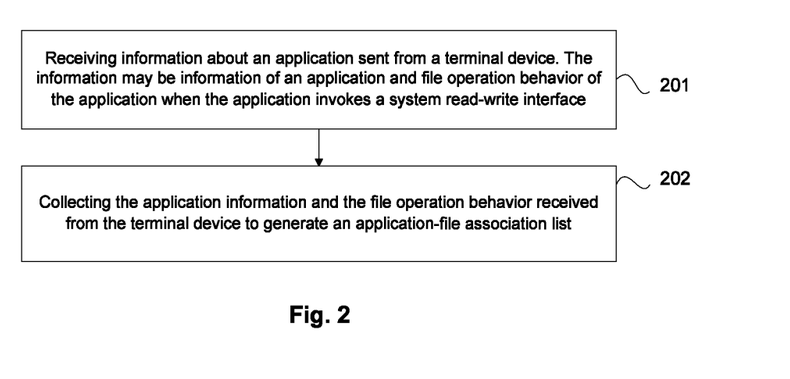
FIG. 2 is a flowchart of a method for application management according to the exemplary embodiments of the present disclosure.

FIG. 2 is a flowchart of a method for application management according to exemplary embodiments of the present disclosure. The method may be implemented in a server, such as the server 900 in FIG. 9. For example, the method may be stored in a storage medium of the server 900 as a set of instructions and may be executed by the processor of the server 900. The method may include the following operations:

201. Receiving information about an application sent from a terminal device. The information may be information of an application and file operation behavior of the application when the application invokes a system read-write interface; and 202. Collecting the application information and the file operation behavior received from the terminal device to generate an application-file association list.

The application information may comprise an application name. Accordingly, the collecting of the application information and the file operation behavior received to generate an application-file association list may comprise: classifying the collected file operation behaviors corresponding to a same application name, and generating the application-file association list according to the classified file operation behaviors and the application name corresponding to the file operation behavior. For example, the filing operation behaviors may include what files an application reads when a user runs the application, as well as what files the application writes during the application is in operation. The server may classify the file operation behaviors according to the name of the applications. File operation behaviors that corresponds to the same application name are collected as the same class. The server then may associate the operation behaviors of the same class and/or category with the corresponding application name to generate the application file association list.

Alternatively, the application information may comprise an application name and application version information, and accordingly, the collecting of the application information and the file operation behavior received to generate an application-file association list may comprise: classifying the file operation behavior corresponding to a same application name and corresponding to same application version information, and generating the application-file association list according to the file operation behavior classified as well as the application name and the application version information corresponding to the file operation behavior. For example, the server may collect the names and versions of the applications installed in the terminal device as well as all file operation behaviors reported from the terminal device. The server may classify the file operation behaviors according to the name and/or version of the applications. For example, file operation behaviors that corresponds to the same application name and version are collected as the same class. The server then may associate the operation behaviors of a same class and/or category with the corresponding application name and version to generate the application file association list.

After the collecting the of the application information and the file operation behavior received to generate an application-file association list, the method may comprise sending the application-file association list to the terminal device.

In the technical solution according to the exemplary embodiments of the present disclosure, the server may realize the association between an application and a file by receiving application information and file operation behavior corresponding to the application collected by a terminal device. A better corresponding relation database may be generated for providing the terminal device with methodic and more abundant management basis since the server can receive application information and file operation behavior from a plurality of different terminal devices. The statistical behavior is conducted at the server side, thus reducing requirements of technical cost for users of terminal device, and preventing from impacting normal operating speed and processing capacity of the terminal device due to accumulation of junk files, and guaranteeing start-up and normal operation of the terminal device.

Figure 3:
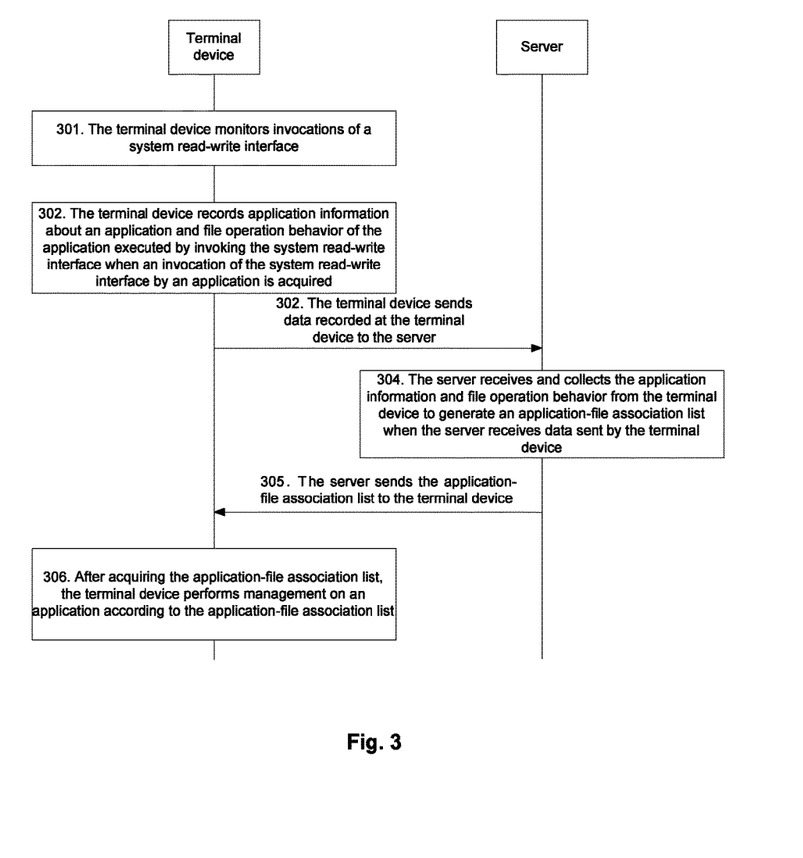
FIG. 3 is a flowchart of a method for application management according to the exemplary embodiments of the present disclosure.

FIG. 3 is a flowchart of a method for application management provided by the exemplary embodiments of the present disclosure. An implementation embodiment of the method may include a server, such as the server 900, and a terminal device, such as the client device 800. The server may be a data mining server with functions of data statistics and data mining. Referring to FIG. 3, the embodiments of the invention may comprise:

301. The terminal device monitors invocations of a system read-write interface;

Wherein, the system read-write interface may comprise a file read interface and a file write interface. When the file read interface is invoked, the file operation behavior generated may be that an application reads a file. When the file write interface is invoked, the file operation behavior generated may be that an application writes a file.

It should be noted that monitoring invocations of the system read-write interface may be realized by monitoring system messages by the terminal device, and invocations of the system read-write interface by applications may be acquired when the terminal device has monitored system messages for invoking the system read-write interface.

302. When the terminal device detects that an application invokes the system read-write interface the terminal device records application information about the application and file operation behavior of the application executed by invoking the system read-write interface;

Wherein, the application information about an application may include information that uniquely identifies the application, such as a name or an identification of the application. In addition, the application information may further include information for differentiating different versions of a same application, such as application version information and the like.

When the system read-write interface is invoked by an application, files corresponding to the file operation behavior of the application may be regarded as files associated with the application. For example, the files may include files that the application reads and writes. Therefore, the association between the application and the file operation behavior may be established by recording the application information and the file operation behavior executed during invocation, thus establishing the association between the application and the files stored in the terminal device. It should be noted that the file operation behavior may include file operation and a file pathname as an operation object. Wherein, the file pathname may include a storage path of a file and a filename of the file.

Table 1 is a saved list of applications and file operation behaviors provided in the embodiments of the present disclosure.

TABLE 1

| Application information | File operation behavior |
|---|---|
| Application A | Read /sdcaed/a.file |
| Application B | Write /var/log/error.log |

Table 1 shows the acquired application information and a storage form of the acquired file operation behavior, for example, the storage form of file operation behavior may be "operation+file pathname". In order to reduce a traffic of data sent between the server and the terminal device, the terminal may only record the application information and the file pathname as an operation object, and the storage form of file operation behavior in Table 1 may be "file pathname".

303. The terminal device sends the recorded data at the terminal device to the server.

For example, the terminal may continuously monitor the terminal device may be conducted continuously, and the sending may either be conducted continuously or be conducted according to a certain rule. Accordingly, Step 303 may include: determining whether the quantity of data recorded by the terminal device reaches a preset threshold value, the terminal device sending data recorded locally to the server when the quantity of data recorded by the terminal device reaches the preset threshold value, and continuing recording data if the quantity of data recorded by the terminal device does not reach the preset threshold value; or the terminal device periodically sending data recorded locally to the server, wherein the period of transmission may either be set by technicians during development or set by users of terminal device.

304. The server collects and/or receives and/or conduct a statistic analysis to the application information and the file operation behavior from the terminal device to generate an application-file association list when the server receives data sent by the terminal device; wherein, the data comprises the application information about the applications and the file operation behavior of the applications executed by invoking the system read-write interfaces, which are recorded by the terminal device.

It should be noted that the server may receive application information and corresponding file operation behavior sent by a plurality of terminal devices, and the server may conduct a statistics analysis according to the application information and the corresponding file operation behavior sent by the plurality of terminal devices.

For example, the application information may include an application name, accordingly, the step of collecting application information and file operation behavior received to generate an application-file association list may include: classifying file operation behavior corresponding to a same application name, and generating an application-file association list according to file operation behavior classified and the application name corresponding to the file operation behavior.

Reference will now be made by taking an example in which the server receives data from terminal device I and terminal device II. Table 2 is a list of application information and file operation behavior sent by terminal device I. Table 3 is a list of application information and file operation behavior sent by terminal device II.

TABLE 2

| Application information | File operation behavior |
|---|---|
| Application A | Read /sdcaed/a.file |
| Application B | Write /var/log/error.log |

TABLE 3

| Application information | File operation behavior |
|---|---|
| Application A | Write /sdcaed/appA/a.txt |
| Application B | Write /sdcaed/appA/tmp/* |

Wherein, the server may collect and conduct a statistic analysis of contents in Table 2 and Table 3, classify file operation behavior corresponding to the same application information into a same category, and establish the association relationship between the same application information and file operation behavior categorized, so as to generate an application-file association list as shown in Table 4 as below.

TABLE 4

| Application information | File operation behavior |
|---|---|
| Application A | /sdcaed/appA/a.txt/sdcaed/a.file |
| Application B | /var/log/error.log<br>sdcaed/appA/tmp/* |

In Table 4, the file operation behavior includes only file pathnames, instead of being categorized according to concrete operation. As an embodiment, it is possible to collect and conduct a statistic analysis of read operation or write operation corresponding to the same application, respectively, so as to ensure accuracy of the statistics.

It should be noted that the server may collect and conduct a statistic analysis on the basis of historical data and newly received data so that the server can accumulate data and generate a more complete association list.

The application information may include an application name and application version information, and accordingly, the collecting application information and file operation behavior received to generate an application-file association list may include: classifying file operation behavior corresponding to the same application name and corresponding to the same application version information, and generating an application-file association list according to file operation behavior classified as well as an application name and application version information corresponding to the file operation behavior.

The terminal device may have installed different versions of an application, and thus there may be different application version information. The file storage paths of different application versions may be varied from one to another. Therefore, in order to avoid losing track of files or deleting the files by mistake, the files may be differentiated according to different versions of the same application for making a statistics.

Reference will now be made by taking an example in which the server receives data from terminal device I and terminal device II. Table 5 is a list of application information and file operation behavior sent by terminal device I. Table 6 is a list of application information and file operation behavior sent by terminal device II.

TABLE 5

| Application name | Application version information | File operation behavior |
| --- | --- | --- |
| Application A | 1.2 | Read /sdcaed/a.file |
| Application B | 0.9 | Write /var/log/error.log |

TABLE 6

| Application name | Application version information | File operation behavior |
| --- | --- | --- |
| Application A | 1.2 | Write /sdcaed/appA/a.txt |
| Application B | 1.1 | Write /sdcaed/appA/tmp/* |

Wherein, the server may collect and conduct a statistic analysis of contents in Table 5 and Table 6, classify file operation behavior corresponding to the same application information which has the same application version information into a same category, and establish the association relationship between the same application information, version information, and file operation behavior categorized, so as to generate an application-file association list as shown in Table 7 as below.

TABLE 7

| Application information | Application version information | File operation behavior |
| --- | --- | --- |
| Application A | 1.2 | /sdcaed/appA/a.txt/sdcaed/a.file |
| Application B | 0.9 | /var/log/error.log |
| Application B | 1.1 | /sdcaed/appA/tmp/* |

In addition, the server may conduct statistical analysis of different versions of the same application according to data received. In an embodiment, the terminal device may also compare application version information recorded by the terminal device with application version information about the application currently acquired, and inform the server of data change when it is determined that changes have taken place in application version information so that the server may collect and conduct a statistic analysis according to old and new application version information.

305. The server sends the application-file association list to the terminal device.

Step 305 may either be executed when the server receives an acquisition request sent by the terminal device or be performed by the server pushing at intervals of a preset time length.

306. After acquiring the application-file association list, the terminal device performs management on an application according to the application-file association list.

The application-file association list is generated by the server through statistical analysis according to information of applications and file operation behaviors of the applications when the applications invoked their corresponding system read-write interface, which may be reported by a plurality of terminal devices. Therefore, the application-file association list may include statistical results based on accumulative data collected from the plurality of terminal devices. Thus the application-file list may be regarded as a complete database of corresponding relation. Accordingly, a terminal device may use the application-file list as a comprehensive and complete guidance to track down an application and files corresponding to the application once the terminal device acquires the application-file association list, thus realizing secure and effective management of applications without necessity of differentiation or discrimination performed manually by users of terminal device.

For example, Step 306 may include following steps:

(1) if a first application is to be uninstalled, the terminal device may query and/or search through the application-file association list according to application information of the first application, finding files and/or pathnames of the files saved in the terminal device and corresponding with the application information, and deleting the files from the terminal device.

When receiving a command for uninstalling the first application, the terminal device queries and/or search through the application-file association list according to application information about the first application, acquires a file record associated with the first application, and deletes the first application as well as the files, corresponding to the file record obtained by such querying, from the terminal device. It should be noted that the file record included in the application-file association list may be a file pathname. Therefore, the deletion operation of the files may be designated in a storage path of the terminal device corresponding to the file pathname which is obtained by such querying, thus maintaining tidiness of the file system and preventing storage space from being occupied by junk files.

For example, the application-file association list acquired may include file records associated with a plurality of different versions of the same application. Therefore, in the process of uninstallation, the application-file association list may be queried according to the application name and application version information about the first application, thus acquiring file record associated with the application name and version information about the first application to be uninstalled currently so as to avoid deletion by mistake or unsuccessful deletion and the like.

(2) when receiving an instruction from a user of the terminal device to browse the application-file association list of an application, the terminal device displays the corresponding application name and a file record associated with the application.

Display of the application name and corresponding file record makes it possible that users of terminal device can view the creator (application) of each file. Compared with a traditional file name, users may know the attribution of each file through the display of the application name, thus greatly improving user experience in management of files and documents.

Figure 4:
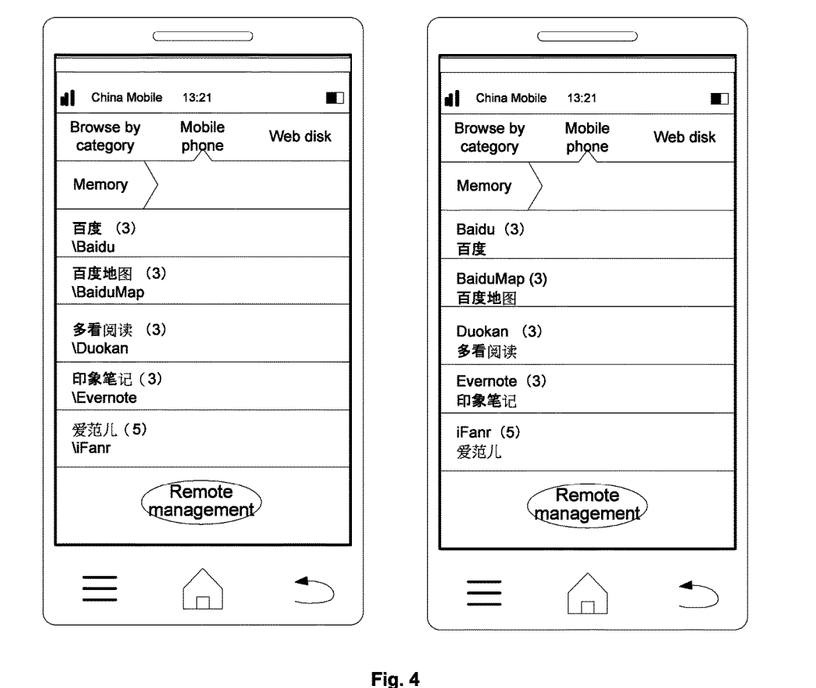
FIG. 4 is a schematic diagram for displaying correspondingly an application name and a file associated with the application according to the exemplary embodiments of the present disclosure.

FIG. 4 is a schematic diagram for displaying an application name and a corresponding file record associated with the application according to the exemplary embodiments of the present disclosure. When the application-file association list is viewed, the application name and file record associated with the application are correspondingly displayed. Referring to the left side of FIG. 4, the application-file association list respectively displays names of applications such as "Baidu™" "BaiduMap™", "Duokan™", "Evernote™" and "iFanr™", and correspondingly displays a number and path of files associated with the applications when these application names are displayed. For example, as shown in FIG. 4, the application-file association list may display the path "\Baidu" for the application "Baidu" and display "(3)" to show that there are three (3) files associated with "Baidu" saved under the path "\Baidu." Similarly, the application-file association list may also display the respective path of applications "BaiduMap", "Duokan," "iFanr," and "Evernote." The application-file association list may also display that "BaiduMap", "Duokan," and "Evernote" are respectively associated with three (3) files, while the application "iFanr" is associated with five (5) files. In addition, Chinese names and English names (or names in different languages) of the application are also displayed, and the number of files associated with the application is correspondingly displayed so as to meet users' demands for different languages. As shown in the right side of FIG. 4, the application-file association list respectively displays Chinese names and English names of applications such as "Baidu-白度", "BaiduMap-白度 地图", "Duokan-多看阅读", "Evernote-印象笔记" and "iFanr-爱范儿", and correspondingly displays the number of files associated with each application. In an embodiment, the language of application names may either be set by technicians during development, or be set by users in use, to which the embodiments of the present disclosure make no restriction.

Further, when receiving a request for viewing the application-file association list, the terminal device displays the application name and file record associated with the application. However, in traditional file management, only file names are displayed, and file names are either English names or names beyond human recognition. In the embodiments of the present disclosure, for the convenience of user access, the terminal device may modify the file pathnames as file names or other user-defined names, thus improving user friendly interface and allowing users to more easily understand and manage their file systems. For example, regarding to the file "/sdcaed/appA/a.txt" associated with Application A in the application-file association list, the file may be displayed as "a.txt" or "document text" when a view request is received. The terminal device may modify the file pathnames at the time that the file is generated or at a time when the user so requests.

In the technical solution according to the exemplary embodiments of the present disclosure, the server may realize the association between an application and a file by receiving application information and file operation behavior corresponding to the application collected by a terminal device. A better corresponding relation database may be generated for providing the terminal device with methodic and more abundant management basis since the server can receive application information and file operation behavior from a plurality of different terminal devices. The statistical behavior is conducted at the server side, thus reducing requirements of technical cost for users of terminal device, and preventing from impacting normal operating speed and processing capacity of the terminal device due to accumulation of junk files, and guaranteeing start-up and normal operation of the terminal device. Further, in the technical solution provided in the embodiments of the present disclosure, real behavior of users may need not to be recorded or traced. Instead, file operation behavior generated by each application may be updated and traced rapidly by automatic monitoring and acquisition, thus user privacy can be protected.

Figure 5:
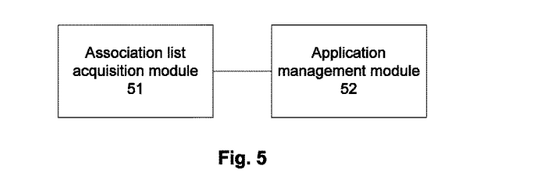
FIG. 5 is a block diagram of a device for application management according to the exemplary embodiments of the present disclosure.

FIG. 5 is a block diagram of a device for application management according to the exemplary embodiments of the present disclosure. The device may be a terminal device, such as the client device 800. The device may include:

An association list acquisition module 51, configured to acquire an application-file association list, which is obtained from a server by making a statistics according to application information of an application and file operation behavior of the application executed by invoking a system read-write interface reported by a terminal device; and An application management module 52, configured to perform management on the application according to the application-file association list.

The device may also include:

An invocation monitoring module, configured to monitor invocations of the system read-write interface;

A behavior recording module, configured to record the application information of the application and the file operation behavior of the application executed by invoking the system read-write interface if an invocation of the system read-write interface from the application is acquired; and A data sending module, configured to send data recorded at the terminal device to the server.

The data sending module may include:

A data sending unit, configured to send periodically the data recorded at the terminal device to the server.

The application management module 52 may include:

A file deletion unit, configured to, if a first application is to be uninstalled, query the application-file association list according to application information of the first application, and to delete files, corresponding to a file record obtained by the querying, from the terminal device.

The application management module 52 may include:

A display unit, configured to display correspondingly an application name and a file record associated with the application if the application-file association list is checked.

In the technical solution according to the exemplary embodiments of the present disclosure, an application-file association list is acquired from a server, thus files associated with an application may be managed during management on the application, by the application and a file record associated with the application as indicated in the list, thereby reducing requirements of technical cost for users of terminal device, and preventing from impacting normal operating speed and processing capacity of the terminal device due to accumulation of junk files, and guaranteeing start-up and normal operation of the terminal device. Further, in the technical solution provided in the embodiments of the present disclosure, real behavior of users may need not to be recorded or traced. Instead, file operation behavior generated by each application may be updated and traced rapidly by automatic monitoring and acquisition, thus user privacy can be protected.

Figure 6:
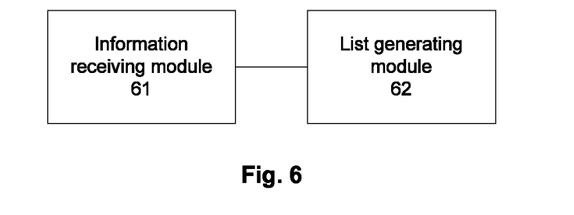
FIG. 6 is a block diagram of a device for application management according to the exemplary embodiments of the present disclosure.

FIG. 6 is a block diagram of a device for application management according to the exemplary embodiments of the present disclosure. The device may be a server, such as the server 900. The device may include:

An information receiving module 61, configured to receive application information of an application and file operation behavior of the application executed by invoking a system read-write interface sent from a terminal device; and A list generating module 62, configured to collect and conduct a statistic analysis of the application information and the file operation behavior received to generate an application-file association list.

The application information may include an application name, accordingly, the list generating module 62 may include:

A first list generating unit, configured to classify the file operation behavior corresponding to a same application name, and to generate the application-file association list according to the file operation behavior classified and the application name corresponding to the file operation behavior; or The application information includes an application name and information version information, accordingly, the list generating module 62 includes:

A second list generating unit, configured to classify the file operation behavior corresponding to a same application name and corresponding to same application version information, and to generate an application-file association list according to the file operation behavior classified as well as the application name and the application version information corresponding to the file operation behavior.

The device also may also include: a list sending module, configured to send the application-file association list to a terminal device.

In the technical solution according to the exemplary embodiments of the present disclosure, the server may realize the association between an application and a file by receiving application information and file operation behavior corresponding to the application collected by a terminal device. A better corresponding relation database may be generated for providing the terminal device with methodic and more abundant management basis since the server can receive application information and file operation behavior from a plurality of different terminal devices. The statistical behavior is conducted at the server side, thus reducing requirements of technical cost for users of terminal device, and preventing from impacting normal operating speed and processing capacity of the terminal device due to accumulation of junk files, and guaranteeing start-up and normal operation of the terminal device. Further, in the technical solution provided in the embodiments of the present disclosure, real behavior of users may need not to be recorded or traced. Instead, file operation behavior generated by each application may be updated and traced rapidly by automatic monitoring and acquisition, thus user privacy can be protected.

It should be noted that, for the management of the application management device provided by the above embodiment performs to applications, the above divided respective function modules are described as an example. In actual applications, the above allocated functions may be implemented with different function modules according to actual needs. That is, the inner structure of the device may be divided into different function modules to accomplish part or all of the functions described as above. In addition, with respect to the application management device provided by the above embodiment belonging to a same conception as the application management method embodiments, the specific implementations have been described in details in the foregoing method, and will not be elaborated herein.

The embodiments of the present disclosure also provide a terminal device, including: one or more processors; a memory; and one or more modules, the one or more modules being stored in the memory and configured to be executed by the one or more processors, wherein the one or more modules have following functions:

Acquiring an application-file association list, the application-file association list being obtained from a server by making a statistics according to application information of an application and file operation behavior of the application executed by invoking a system read-write interface reported from a terminal device; and Performing management on the application according to the application-file association list.

The one or more modules are also configured to monitor invocations of the system read-write interface;

record the application information of the application and the file operation behavior of the application executed by invoking the system read-write interface if an invocation of the system read-write interface from the application is acquired; and send data recorded at the terminal device to the server.

The one or more modules are also configured to send periodically the data recorded at the terminal device to the server.

The one or more modules are also configured to, if a first application is to be uninstalled, query the application-file association list according to application information of the first application, and delete files, corresponding to a file record obtained by the querying, from the terminal device.

The one or more modules are also configured to display correspondingly an application name and a file record associated with the application if the application-file association list is checked.

In the technical solution according to the exemplary embodiments of the present disclosure, an application-file association list is acquired from a server, thus files associated with an application may be managed during management on the application, by the application and a file record associated with the application as indicated in the list, thereby reducing requirements of technical cost for users of terminal device, and preventing from impacting normal operating speed and processing capacity of the terminal device due to accumulation of junk files, and guaranteeing start-up and normal operation of the terminal device. Further, in the technical solution provided in the embodiments of the present disclosure, real behavior of users may need not to be recorded or traced. Instead, file operation behavior generated by each application may be updated and traced rapidly by automatic monitoring and acquisition, thus user privacy can be protected.

Figure 7:
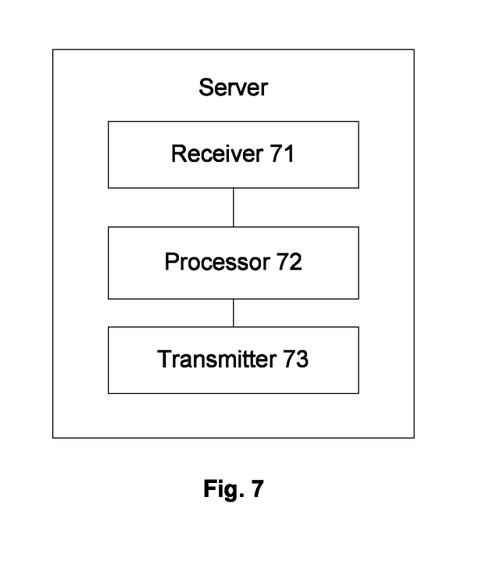
FIG. 7 is a block diagram of a server according to the exemplary embodiments of the present disclosure.

FIG. 7 is a block diagram of the structure of a server according to the exemplary embodiments of the present disclosure. The server may adapt a hardware structure of the server 900. Referring to FIG. 7, the server may include: a receiver 71, a processor 72 and a transmitter 73, wherein the receiver 71, the processor 72 and the transmitter 73 are electronically connected with each other, as shown in FIG. 7.

The receiver 71 is configured to receive application information of an application and file operation behavior of the application executed by invoking a system read-write interface sent from a terminal device; and The processor 72 is configured to collect and conduct a statistic analysis of the application information and the file operation behavior received to generate an application-file association list.

The application information includes an application name, accordingly, the processor 72 is also configured to classify the file operation behavior corresponding to a same application name, and generate the application-file association list according to file operation behavior classified and the application name corresponding to the file operation behavior.

Alternatively, the application information includes an application name and application version information, accordingly, the processor 72 is also configured to classify the file operation behavior corresponding to a same application name and corresponding to same application version information, and generate the application-file association list according to the file operation behavior classified as well as the application name and the application version information corresponding to the file operation behavior.

The transmitter 73 is configured to send the application-file association list to the terminal device.

In the technical solution according to the exemplary embodiments of the present disclosure, the server may realize the association between an application and a file by receiving application information and file operation behavior corresponding to the application collected by a terminal device. A better corresponding relation database may be generated for providing the terminal device with methodic and more abundant management basis since the server can receive application information and file operation behavior from a plurality of different terminal devices. The statistical behavior is conducted at the server side, thus reducing requirements of technical cost for users of terminal device, and preventing from impacting normal operating speed and processing capacity of the terminal device due to accumulation of junk files, and guaranteeing start-up and normal operation of the terminal device. Further, in the technical solution provided in the embodiments of the present disclosure, real behavior of users may need not to be recorded or traced. Instead, file operation behavior generated by each application may be updated and traced rapidly by automatic monitoring and acquisition, thus user privacy can be protected.

It should be understood for those skilled in the art that a part of or the whole of steps in the embodiments may be implemented by hardware, or by programs instructing the related hardware. The programs may be stored in a computer readable medium. The storage medium described as above may be a red-only memory, a magnetic disc, an optical disc or the like.

The embodiments described above are only illustrated as preferred embodiments of the present disclosure, and are not intended to limit the present disclosure. All modifications, equivalent substitutions and improvements made within the spirit and principles of the present disclosure shall fall within the protection scope of the present disclosure.

What is claimed is:

1. A terminal device, comprising:
a storage medium comprising a set of instructions for application management; and
a processor in communication with the storage medium, wherein when executing the set of instructions, the processor is directed to:
acquire an application-file association list from a server, wherein the application-file association list includes an identification of an application installed in the terminal device and cumulative operation behaviors of the application on a plurality of terminal devices, the operation behaviors of the application comprising file operations and pathnames of files associated with the application;
record, when the application invokes a system read-write interface of the terminal device, application information of the application comprising an application name and application version information, record the operation behavior of the application in a file, and send the application information and the file to the server;
configure the server to collect and conduct a statistic analysis of the application information and the operation behavior so as to generate the application-file association list;
manage the application according to the application-file association list; and
when a command for uninstalling the application is received by the terminal device, search through the application-file association list according to the application identification of the application, acquire a file record associated with the application according to the application identification, delete the application from the terminal device, and delete files corresponding to the acquired file record from the terminal device.

2. The terminal device of claim 1, wherein the application-file association list further comprises a file recording a system read-write interface invocation history of the application in at least one terminal device of the plurality of terminal devices.

3. The terminal device of claim 1, wherein to manage the application the processor is further directed to:
display a name of the application and the files associated with the application.

4. The terminal device of claim 1, wherein the application information and the file are periodically sent to the server.

5. A method for application management, comprising:
acquiring, by a terminal device, an application-file association list from a server, wherein the application-file association list includes an identification of an application installed in the terminal device and cumulative operation behaviors of the application on a plurality of terminal devices, the operation behaviors of the application comprising file operations and pathnames of files associated with the application;
recording, when the application invokes a system read-write interface of the terminal device, application information of the application comprising an application name and application version information, recording the operation behavior of the application in a file, and sending the application information and the file to the server;
configuring the server to collect and conduct a statistic analysis of the application information and the operation behavior so as to generate the application-file association list;
managing the application, by the terminal device, according to the application-file association list; and
when a command for uninstalling the application is received by the terminal device, searching through the application-file association list according to the application identification of the application, acquiring a file record associated with the application according to the application identification, deleting the application from the terminal device, and deleting files corresponding to the acquired file record from the terminal device.

6. The method of claim 5, wherein the application-file association list further comprises a file recording a system read-write interface invocation history of the application in at least one terminal device of the plurality of terminal devices.

7. The method of claim 5, wherein the managing of the application comprises:
displaying a name of the application and the files associated with the application.

8. The method of claim 5, wherein the application information and the file are periodically sent to the server.

9. A processor-readable storage medium, comprising a set of instructions for application management, wherein when being executed by a processor of a terminal device, the set of instructions directs the processor to conduct acts of:
- acquiring an application-file association list from a server, wherein the application-file association list includes an identification of an application installed in the terminal device and cumulative operation behaviors of the application on a plurality of terminal devices, the operation behaviors of the application comprising file operations and pathnames of files associated with the application;
- recording, when the application invokes a system read-write interface of the terminal device, application information of the application comprising an application name and application version information, recording the operation behavior of the application in a file, and sending the application information and the file to the server;
- configuring the server to collect and conduct a statistic analysis of the application information and the operation behavior so as to generate the application-file association list;
- managing the application according to the application-file association list; and
- when a command for uninstalling the application is received by the terminal device, searching through the application-file association list according to the application identification of the application, acquiring a file record associated with the application according to the application identification, deleting the application from the terminal device, and deleting files corresponding to the acquired file record from the terminal device.

10. The storage medium of claim 9, wherein the application-file association list further comprises a file recording a system read-write interface invocation history of the application in at least one terminal device of the plurality of terminal devices.

11. The storage medium of claim 9, wherein the managing of the application comprises:
- displaying a name of the application and the files associated with the application.

* * * * *